United States Patent
Wasilewski

(10) Patent No.: US 7,907,943 B2
(45) Date of Patent: Mar. 15, 2011

(54) STATISTICAL SCALING OF SOFT DECISIONS BEFORE DECODING

(75) Inventor: Bartosz Krzysztof Wasilewski, Letchworth Garden City (GB)

(73) Assignees: MStar Semiconductor, Inc., Caymans Island (KY); MStar Software R&D, Ltd., Shenzhen (CN); MStar France SAS, Issy les Moulineaux (FR); MStar Semiconductor, Inc. (TW)

( * ) Notice: Subject to any disclaimer, the term of this patent is extended or adjusted under 35 U.S.C. 154(b) by 1185 days.

(21) Appl. No.: 10/534,394

(22) PCT Filed: Nov. 5, 2003

(86) PCT No.: PCT/GB03/04755
§ 371 (c)(1),
(2), (4) Date: Nov. 16, 2005

(87) PCT Pub. No.: WO2004/042934
PCT Pub. Date: May 21, 2004

(65) Prior Publication Data
US 2006/0179398 A1    Aug. 10, 2006

(30) Foreign Application Priority Data
Nov. 7, 2002   (GB) .................................. 0226003.2

(51) Int. Cl.
*H04Q 7/20*   (2006.01)
(52) U.S. Cl. ........................ 455/423; 375/341
(58) Field of Classification Search .................. 375/341, 375/262, 340; 455/303, 305
See application file for complete search history.

(56) References Cited

U.S. PATENT DOCUMENTS

| | | | |
|---|---|---|---|
| 5,267,272 A | 11/1993 | Cai et al. | |
| 5,271,042 A | 12/1993 | Borth et al. | |
| 5,404,315 A | 4/1995 | Nakano et al. | |
| 6,347,124 B1 * | 2/2002 | Antia et al. | 375/341 |
| 2002/0168013 A1 * | 11/2002 | Attallah et al. | 375/259 |
| 2003/0156563 A1 * | 8/2003 | Papasakellariou et al. | 370/335 |
| 2007/0286272 A1 * | 12/2007 | Richards et al. | 375/238 |

FOREIGN PATENT DOCUMENTS

| | | |
|---|---|---|
| WO | WO 02/47276 A2 | 6/2002 |
| WO | WO 02/082694 A1 | 10/2002 |
| WO | WO 03/085917 A1 | 10/2003 |

OTHER PUBLICATIONS

Lee, Y. K. et al., "Normalization, Windowing and Quantization of Soft-Decision Viterbi Decoder Inputs in CDMA Systems," Vehicular Technology Conference, 1999 IEEE 49th Houston, TX, USA, pp. 221-225, (May 16-20, 1999).

* cited by examiner

*Primary Examiner* — Phuoc Doan
(74) *Attorney, Agent, or Firm* — Edell, Shapiro & Finnan, LLC

(57) ABSTRACT

A wireless-communications unit has a receiver chain including a codec decoding the output of a rake receiver. Soft decisions passing from the rake receiver to the codec are scaled. The scaling factor can be tuned by monitoring a function based on the cumulative probability distribution function of the scaled soft decisions.

8 Claims, 4 Drawing Sheets

STATISTICAL SCALING OF SOFT DECISIONS BEFORE DECODING

CROSS REFERENCE TO RELATED APPLICATIONS

This application is a national phase application based on international application no. PCT/GB2003/004755, filed Nov. 5, 2003, which claims the priority of Great Britain Patent Application No. 0226003.2, filed Nov. 7, 2002, the content of both of which is incorporated herein by reference.

The invention relates to the field of wireless-communications networks. For example, the invention finds application in a network organised according to the UMTS (Universal Mobile Telecommunications System) standards. In particular, the invention is concerned with the receiver architecture of a participant in a wireless-communications network, such as a base station or a mobile telephone.

FIG. 1 shows a block diagram of a receiver chain for a UMTS mobile telephone 10. Radio frequency signals transmitted to the telephone 10 are received on antenna 12 and passed to demodulator 14. In the demodulator 14, spread-spectrum signals are extracted from their radio frequency carrier signals and are sent to a digital to analogue converter (DAC) 16. The digitised spread-spectrum signals are then sent to a rake receiver 18. The rake receiver identifies multi-path components within the spread-spectrum signals, despreads the multi-path components and combines them to produce an encoded signal at the chip rate consisting of a series of soft decisions. The encoded signal is then operated on by scaling unit 20 which applies a scaling factor to the soft decisions constituting the encoded signal. The scaled version of the encoded signal output by the scaling unit 20 is then passed to a codec 22 (an encoder-decoder). The codec 22 decodes the encoded signal using a process such as the Viterbi algorithm. The codec 22 outputs a symbol-rate message signal as a result of the decoding process. The message signal then undergoes further processing within the telephone 10, as indicated by processor block 24. For example, the message signal could indicate digitised speech which requires additional processing to convert it into an analogue signal which can be emitted from a loudspeaker (not shown) forming part of the telephone 10.

As mentioned above, the scaling unit 20 scales the soft decisions that are produced by the rake receiver 18 for decoding in the codec 22. A certain degree of scaling is required to optimise the operation of the codec 22. The scaling unit 20 controls the degree of scaling that it applies to the soft decisions by monitoring its own output on feedback path 26. That is to say, the scaling unit 20 monitors the scaled soft decisions that it sends to the codec 22 and uses the monitored soft decisions in an algorithm which determines how the degree of scaling should be adjusted.

The details of the operation of the algorithm are not important and can vary from one implementation to another. However, the algorithm will produce an output in the form of an adjustment to be made to the scaling factor that is applied to the soft decisions and this output is derived by monitoring the power of the soft decisions arriving on the feedback path 26. A significant disadvantage of this approach will now be discussed.

FIG. 2 is a plot of a digital signal with amplitude and time represented on the vertical and horizontal axes, respectively. In FIG. 2, the signal comprises a series of digital samples, issued at a rate of one sample per unit of time. The power, P, contained in the signal shown in FIG. 2 is simply the sums of the squares of the amplitudes of the individual samples making up the signal, divided by the number of samples:

$$S=0^2+1^2+2^2+3^2+2^2+1^2+0^2+1^2+2^2+3^2+2^2+1^2+0^2+1^2+2^2+1^2+0^2+1^2=45$$

$$P=45/18=2.5$$

FIG. 3 shows what would happen if the signal of FIG. 2 became saturated at an amplitude of 2. The power of the saturated signal can also be calculated:

$$S=0^2+1^2+2^2+2^2+2^2+1^2+0^2+1^2+2^2+2^2+2^2+1^2+0^2+1^2+2^2+1^2+0^2+1^2=35$$

$$P=35/18=1.9$$

It will be seen that when the signal becomes saturated at an amplitude of two, the power value is drastically different to the power value that is obtained when the signal is not saturated. Therefore, in situations where the signal might become saturated, the value of the power of the signal might not be a good parameter to monitor.

Sometimes, in the receiver chain shown in FIG. 1, it is desirable to use a certain form of decoding algorithm within the codec 22, this algorithm being of a kind whose accuracy is increased if the signal that it operates on is partially saturated. Therefore, the situation can arise where the scaling unit 20 is intentionally inducing partial saturation of the soft decisions provided by the rake receiver 18. In this situation, a problem arises if the algorithm used to scale the soft decisions relies on the power of the soft decisions that are monitored on feedback path 26. That is to say, because the power value for any given signal monitored on feedback path 26 can vary tremendously depending upon the degree of scaling being applied to the signal, the power of the signal monitored on path 26 is not always a reliable parameter to use for controlling the algorithm which scales the soft decisions.

One aim of the present invention is to ameliorate, at least in part, the disadvantage discussed above.

According to one aspect the invention provides a method of conditioning signal values being conveyed to a decoder in a wireless-communications network participant, the method comprising scaling the values, monitoring the probability distribution of the amplitudes of the scaled values and using the information gained through the monitoring step to determine if the degree of scaling should be adjusted.

The invention also consists in a wireless-communications network participant, comprising a decoder for decoding a signal received at the participant, scaling means for scaling values of the signal being conveyed to the decoder, monitoring means for monitoring the probability distribution of the amplitudes of the scaled values and control means for using information supplied by the monitoring means to determine if the degree of scaling should be adjusted. Such a method can be implemented by as a computer program. Such programs can be accommodated by an appropriate data carrier, such as a read only memory.

Thus, the invention provides an alternative scheme for scaling a stream of signal values which is less effected by saturation.

In one embodiment, the probability distribution of the scaled values is monitored by determining the fraction of a group of signal values that exceed a certain amplitude.

The invention can be used, for example, in a participant of a 3G telecommunications network and the decoder is a bit-rate signal decoder using, for example, the Viterbi or max log-MAP algorithm.

By way of example only, an embodiment of the present invention will now be described with reference to the accompanying figures, in which.

In the embodiment that will now be described, the power of the signal on path 26 is not the parameter which is used to control the algorithm which scales the soft decisions. Instead, a parameter based on the cumulative probability density function (CDF) of the signal is used. In fact, the parameter that is used to control the scaling algorithm is 1-CDF and is hereinafter termed the complementary CDF and is referred to as Q for ease of reference.

The CDF for a given amplitude value of a digital signal is the ratio of the number of samples in the signal where the amplitude is equal to or less than the given value versus the total number of samples in the signal. The parameter Q is the ratio of the number of samples where the amplitude value exceeds the given value versus the total number of samples in the signal. That is to say, CDF+Q=1.

Figure 3:
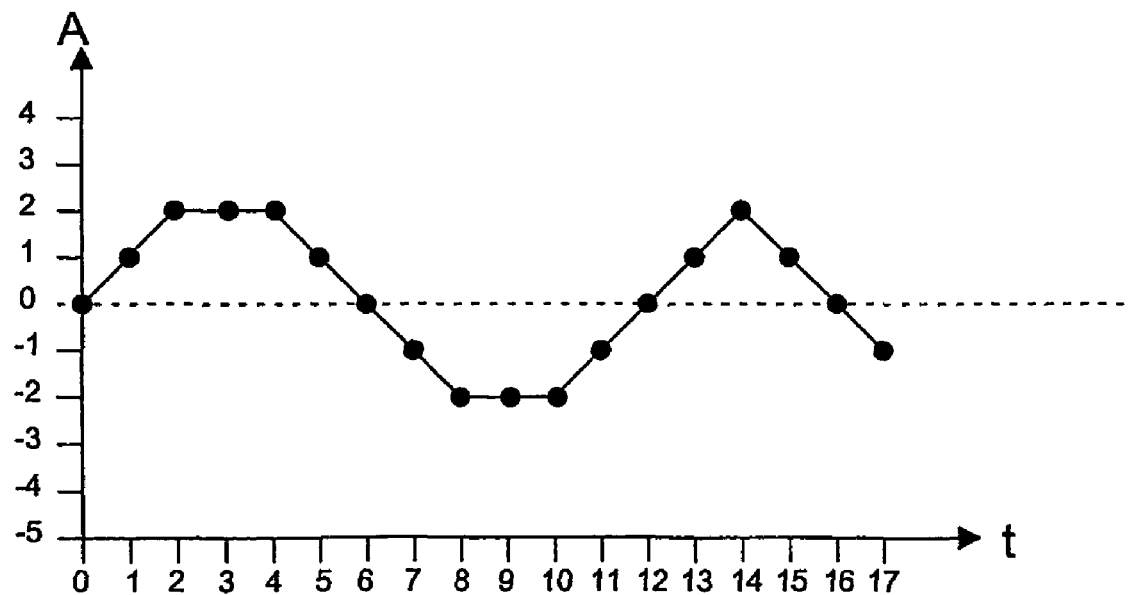
FIG. 3 is a plot of the signal of FIG. 2 in a partially saturated condition.
Figure 4:
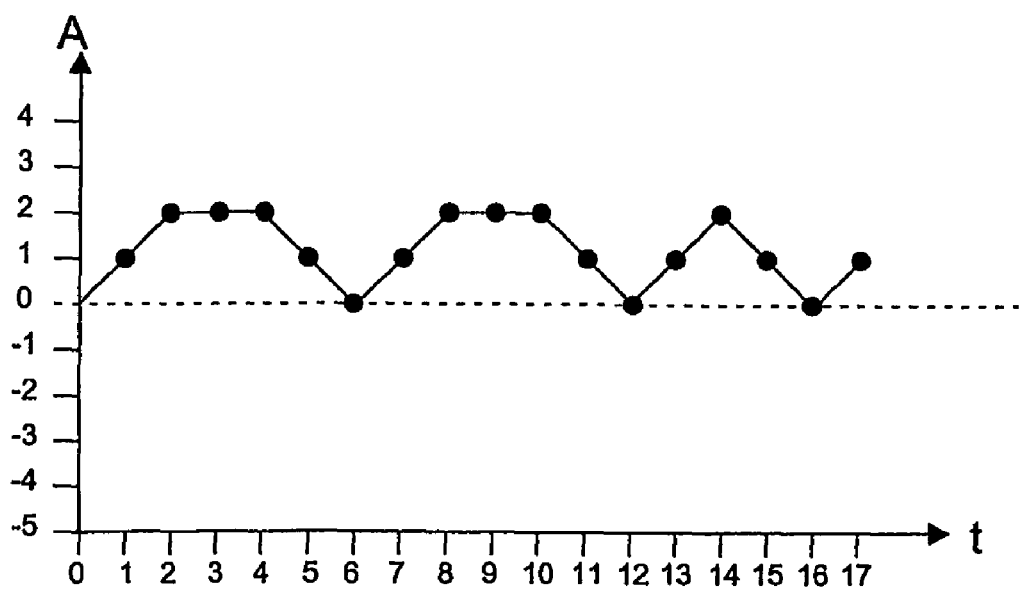
FIG. 4 is a plot of the amplitude of the soft decisions of FIG. 3.

To illustrate the calculation of the parameter Q, we will use the example of the saturated signal of FIG. 3. FIG. 4 is a plot of the amplitude of the saturated signal of FIG. 3 versus time. In this example, we will calculate Q [1], which is to say the ratio of the number of samples where the amplitude exceeds 1 versus the total number of samples.

Figure 5:
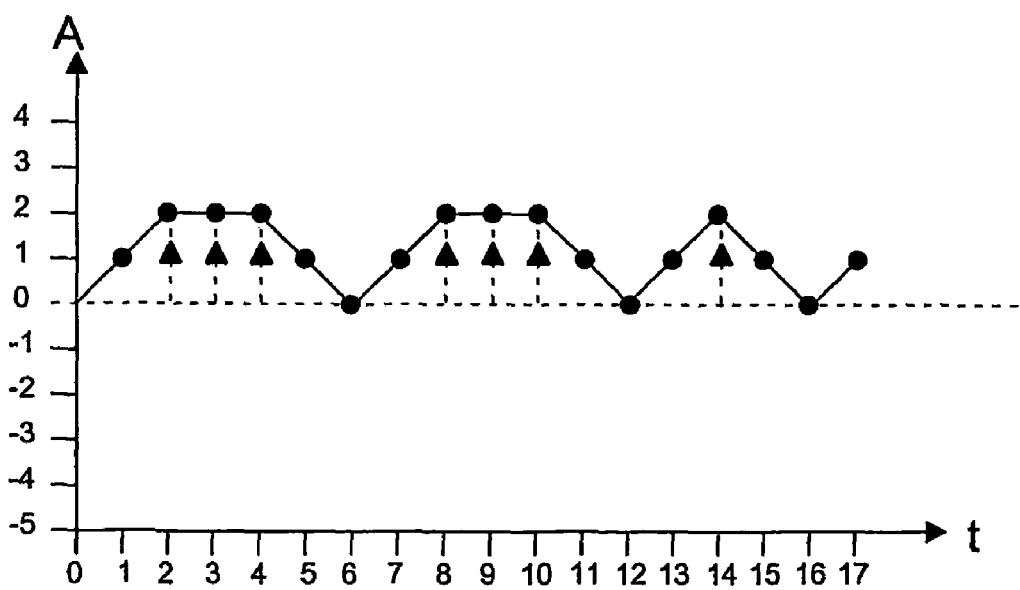
FIG. 5 illustrates the performance of a probability distribution measurement on the wave form of FIG. 4.

FIG. 5 illustrates this calculation. As can be seen in FIG. 5, the amplitude of the signal exceeds the value 1 on 7 occasions (as indicated by the vertical arrows) out of the 18 amplitude points shown. Therefore, Q [1]=0.389 for the signal shown in FIG. 5.

Figure 6:
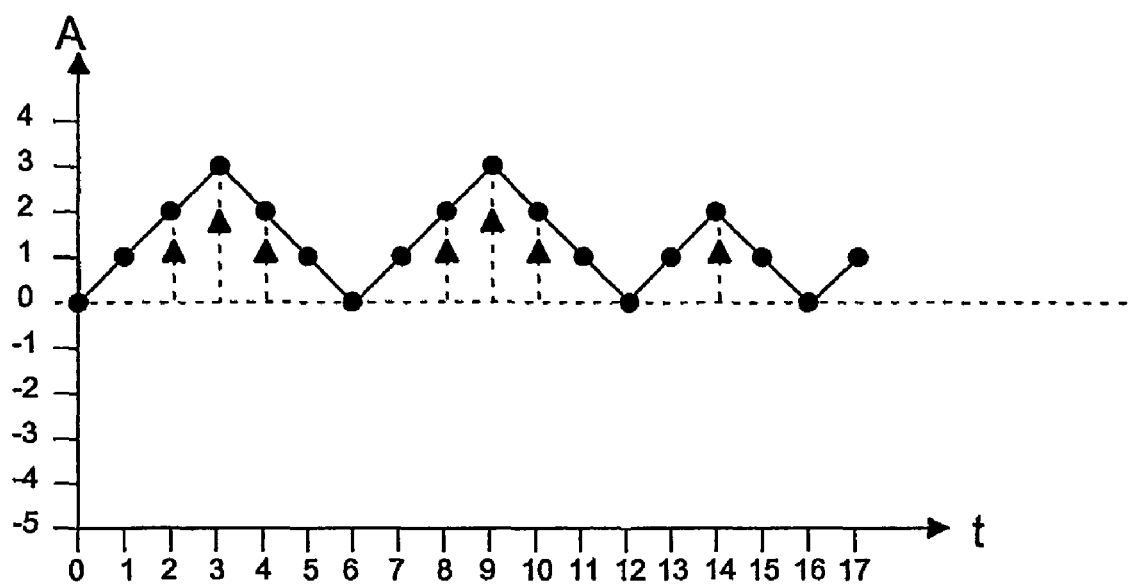
FIG. 6 illustrates the performance of a probability distribution measurement on a trace representing the amplitude of the signal shown in FIG. 2.

FIG. 6 shows what the calculation of FIG. 5 would have been like if the signal had not been saturated. Again, the amplitude of the signal exceeds the value 1 on 7 occasions (as indicated by the vertical arrows) out of the 18 sample points. Therefore, the result for Q [1] is unchanged by saturation in this example.

Therefore, it follows that CDF, or CDF based measurements, can be used to make an assessment of the amplitude profile of a signal without being grossly effected by saturation. Of course, the degree of effect that saturation has on a CDF or Q value depends on the amplitude value at which saturation occurs relative to the amplitude at which the CDF or Q function is evaluated. For example, if the amplitude value of saturation is less than the amplitude value at which Q is evaluated, then the Q value will be significantly distorted by saturation. Therefore, it is important to keep the amplitude value at which the Q function is calculated to a level below the saturation limit.

Figure 1:
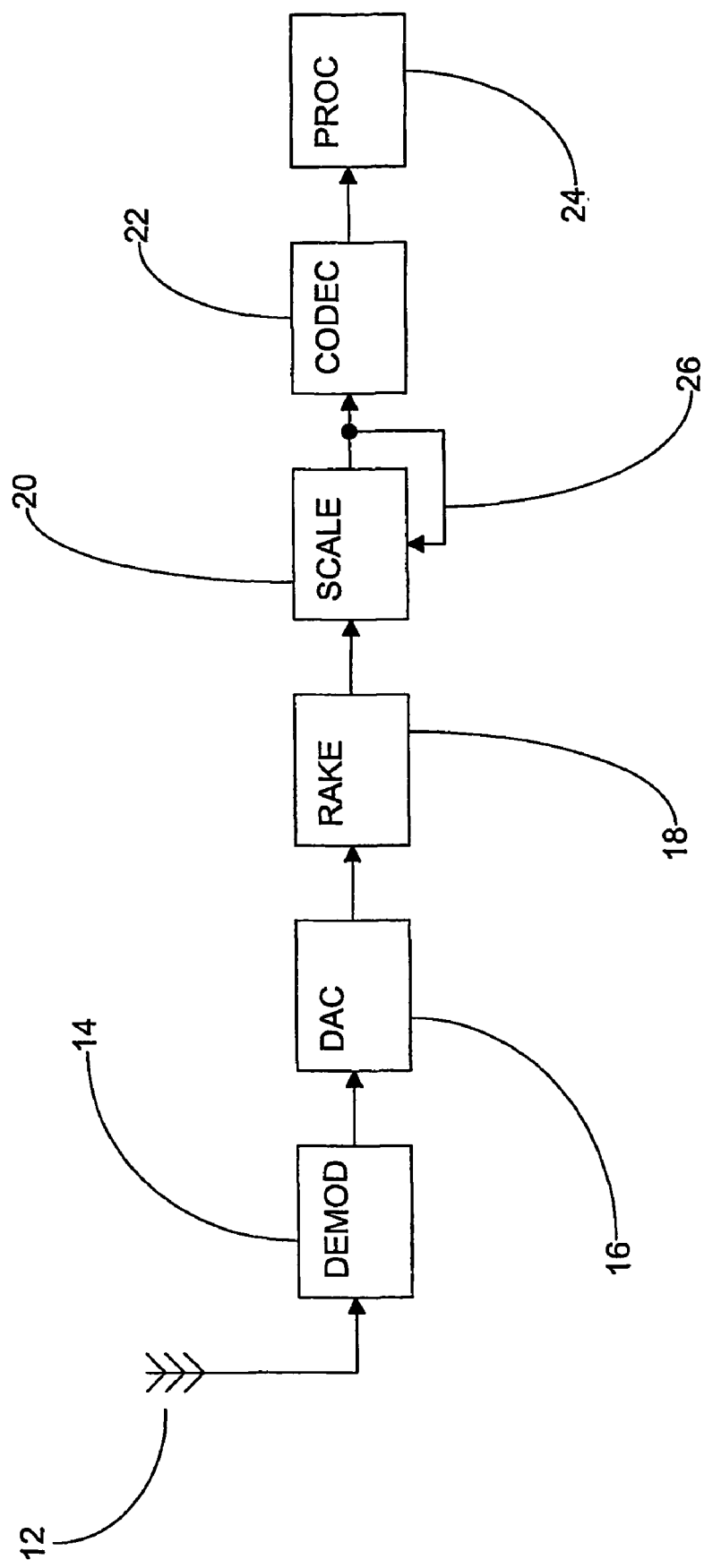
FIG. 1 is a block diagram of a receiver chain in a UMTS mobile telephone.
Figure 2:
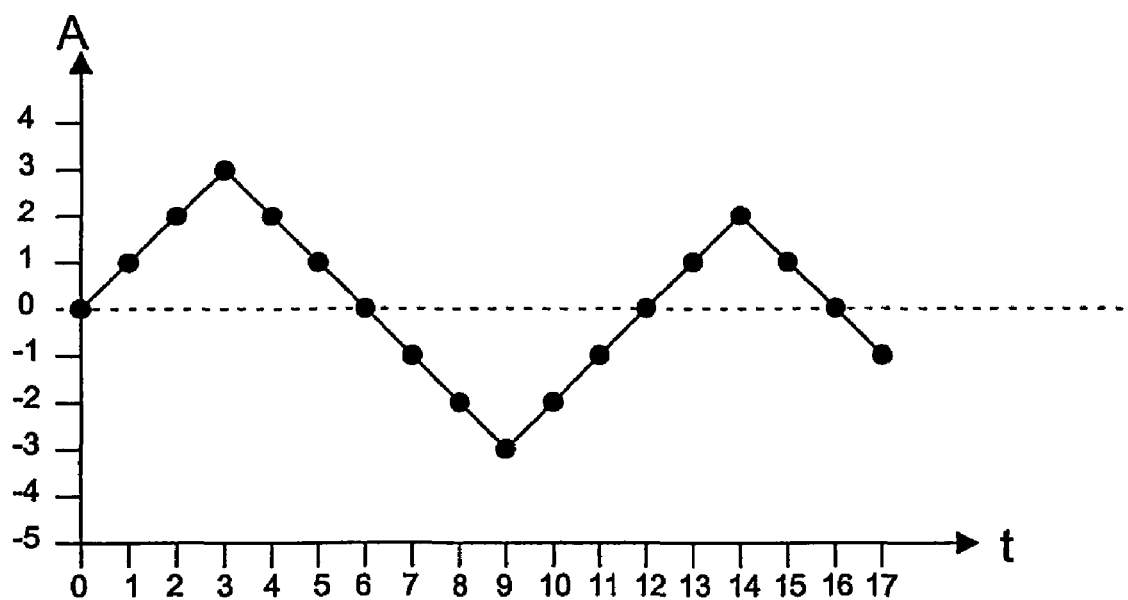
FIG. 2 is a plot of a group of soft decisions representing a section of a signal.

Returning to the embodiment, with the exception of scaling unit 20, the operation of the receiver chain is much the same as that described earlier with reference to FIG. 1. In the embodiment, the scaling unit between the rake receiver and the codec evaluates the soft decisions on the feedback path by determining their Q function value at a selectable amplitude level.

It is worth bearing in mind, as will be readily apparent to the skilled person, that the waveforms shown in FIGS. 2 to 6 are for the purposes of illustration only and that UMTS signals have a different appearance.

The invention claimed is:

1. A method of conditioning signal values being conveyed to a decoder in a wireless-communications network receiver, the method comprising steps of:
   (a) scaling the signal values, outputted by a rake receiver, by a scaling factor;
   (b) monitoring the probability distribution of the amplitudes of the scaled signal values including generating a parameter based on the probability distribution that is not grossly effected by amplitude saturation of the signal values; and
   (c) adjusting the scaling factor according to the parameter obtained in step (b).

2. The method according to claim 1, wherein the step (b) comprises calculating a complementary cumulative probability density function for a signal value magnitude.

3. The method according to claim 1, wherein the step (b) comprises determining the fraction of a group of the scaled signal values that exceed a certain magnitude.

4. The method according to claim 1, wherein the decoder is a 3G telecommunications bit-rate signal decoder.

5. A wireless-communications network receiver, comprising:
   a scaling means for scaling signal values, outputted by a rake receiver, by a scaling factor so as to output scaled signal values to a decoder; and
   a monitoring means for monitoring the probability distribution of amplitudes of the scaled signal values and for generating a parameter based on the probability distribution that is not grossly effected by amplitude saturation of the signal values;
   wherein the scaling means adjusts the scaling factor according to the parameter generated by the monitoring means.

6. The wireless-communications network receiver according to claim 5, wherein the monitoring means is adapted to calculate a complimentary cumulative probability density function for a signal value magnitude.

7. The wireless-communications network receiver according to claim 5, wherein the monitoring means is adapted to determine fraction of a group of signal values the exceed a certain magnitude.

8. The wireless-communications network receiver according to claim 5, wherein the decoder is a 3G telecommunications bit-rate signal decoder.

* * * * *